United States Patent [19]

Ratkowski

[11] 4,254,065

[45] Mar. 3, 1981

[54] INJECTION MOLDING OF CONTACT LENSES

[76] Inventor: Donald J. Ratkowski, 1954 E. Glencove, Mesa, Ariz. 85203

[21] Appl. No.: 27,148

[22] Filed: Apr. 4, 1979

Related U.S. Application Data

[63] Continuation of Ser. No. 834,234, Sep. 19, 1977, abandoned.

[51] Int. Cl.³ .............................................. B29D 11/00
[52] U.S. Cl. .................... 264/2.5; 264/328.8; 264/328.15; 425/808
[58] Field of Search ....................... 264/1, 329; 425/808

[56] References Cited

U.S. PATENT DOCUMENTS

| 2,178,873 | 11/1939 | Feinbloom | 264/1 |
| 2,369,758 | 2/1945 | Sheldon | 264/1 |
| 2,443,826 | 6/1948 | Johnson | 425/808 |
| 3,221,083 | 11/1965 | Crandon | 264/1 |
| 3,227,507 | 1/1966 | Feinbloom | 264/1 |
| 3,662,040 | 5/1972 | Usbach et al. | 264/1 |
| 3,760,045 | 9/1973 | Thiele et al. | 264/1 |
| 3,784,657 | 1/1974 | Hutchinson et al. | 264/329 |
| 3,948,871 | 4/1976 | Butterfield, Jr. | 264/1 |
| 4,008,031 | 2/1977 | Weber | 264/1 |

OTHER PUBLICATIONS

"Injection Molding," W.O. Elliot, *Modern Plastics Encyclopedia 1968*, vol. 45, No. 1A, 7/67 McGraw Hill NYC, pp. 720, 721, 733.

Primary Examiner—James B. Lowe
Attorney, Agent, or Firm—Gregory L. Nelson

[57] ABSTRACT

The present invention relates to lenses and more particularly relates to the method of forming prescription contact lenses of the single vision, bicurve, lenticular, bifocal and other types by injection molding. The lens is formed from a blank having a cylindrical configuration with a concave or convex surface. The concave or convex surface forms a surface such as the base curve of the completed lens minimizing finishing operations. The lens blanks are supplied to the practitioners in a series having a completed or substantially completed curved surface. The lenses are formed by injection molding closely controlling parameters such as injection pressure, time, and temperature to avoid internal stress in the lens.

4 Claims, 7 Drawing Figures

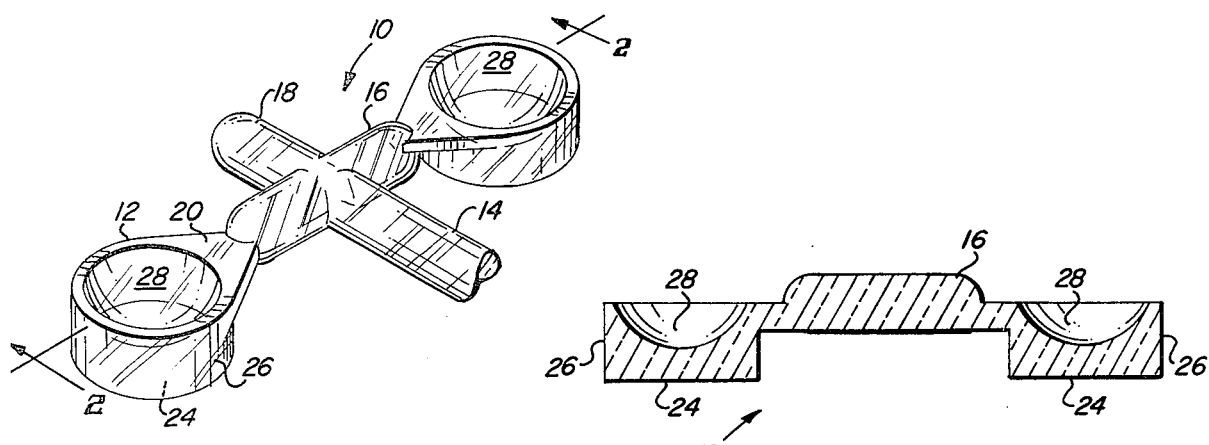
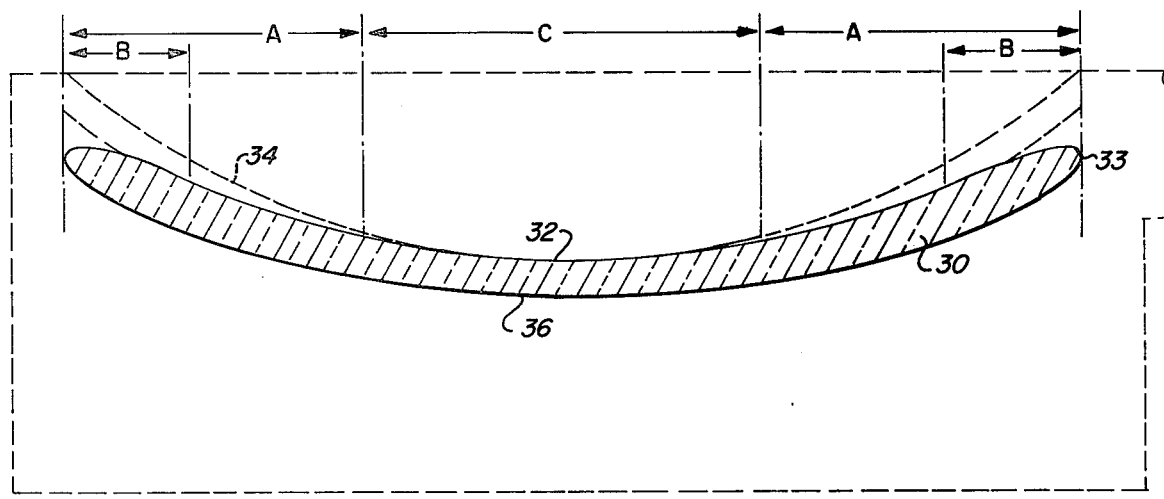
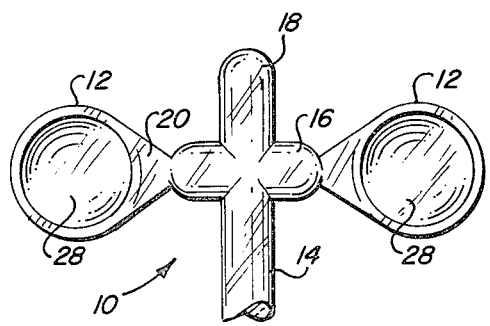
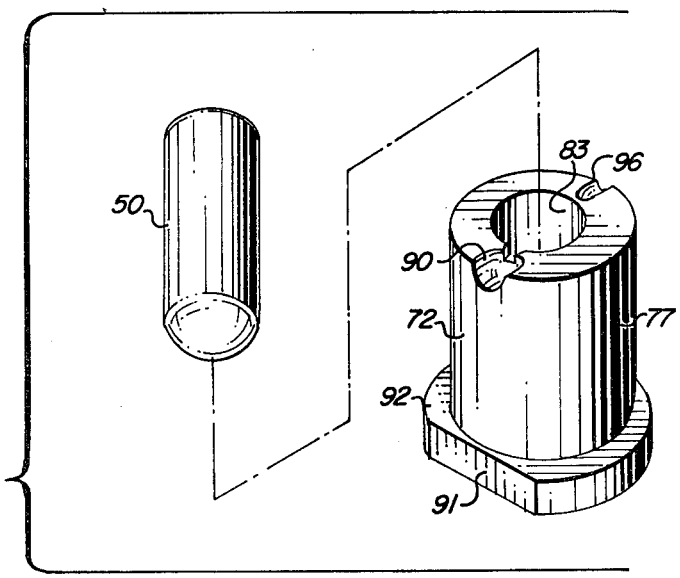

INJECTION MOLDING OF CONTACT LENSES

This is a continuation of application Ser. No. 834,234, filed Sep. 19, 1977 now abandoned.

DISCUSSION OF THE PRIOR ART

Contact lenses formed of plastic material for optical applications are well known. A primary application is the area of contact lenses. Generally, contact lenses fall into two major categories generally characterized as soft hydrophillic and semi-rigid or hard contact lenses which are generally hydrophobic. In addition to characterization of lenses as "soft" or "hard", contact lenses are often classified as corneal or scleral. A scleral lens is a contact lens whose main bearing portion rests upon the sclera of the eye. A corneal lens covers or rests upon the cornea of the eye. Other specialized types of lenses as inter-occular lenses for surgical implantation in the eye are also known.

Because of the stringent quality requirements for first quality contact lenses, extreme precision is required in the making of these lenses. Most plastic contact lens blanks are formed by initially casting an elongate or cylindrical rod from a plastic material, as for example, cellulose acetate butyrate or polymethyl methacrylate. The cylindrical rod is transversely cut to form a number of cylindrical lens blanks or buttons. The blanks, having generally opposite planar surfaces are furnished to the manufacturer and the lenses are machined to prescription and fitted to the patient. Various machining operations may be accomplished. For example, it is common practice to abrade the lens blank using a lathe with a diamond bit or other machine tool such as a spherical rotating grinder. However, the abrading or machining operation will impart markings in the surface of the lenses which impairs optical quality. The lens surface must be optically polished to remove the machined surface markings.

Another problem in forming lenses from elongate rods is that it is difficult to fabricate the rods having a uniform density. Density variations create a considerable optical problem as variations in the refractive index and mechanical properties will result when the lens is manufactured.

In an effort to avoid the problems of manufacturing plastic contact lenses inherent in utilizing sections cut from plastic rods, the prior art suggests the formation of contact lenses by pouring the plastic between two parallel spaced glass sheets to form a resultant plastic sheet having clear surfaces. The plastic sheet is then cut into squares that are slightly larger than the desired diameter of the circular lens blanks. The square pieces are positioned between spindles and are rotated while the periphery is being machined by a cutting tool to the desired diameter. Reference is made to U.S. Pat. No. 3,651,192.

Attempts have been also made at casting high quality plastic lenses. U.S. Pat. No. 3,380,718 suggests the use of a lower concave mold which is filled with appropriate material. A convex mold is lowered by a centering rod mechanism into the monomer. Heat is applied until the liquid is in the gel stage. Pressure is further increased after the gel stage to reduce shrinkage and other undesirable characteristics. While this process represents an advance in the state of the art, it is generally limited to special type lenses, such as bifocal lenses and is not applicable to all types of lenses and to the various plastic materials conventionally used in the field of contact lenses. Warp as well as shrinkage may occur with this method.

Briefly, the present invention relates to a lens blank and the method of making lenses by injection molding techniques. The resulting lens blank has a planar surface and a concave or convex curved surface or two parallel flat surfaces. The curved surface when the lens is completed forms the anterior or posterior surface of the completed lens and finishing operations are minimized. The present invention is applicable to contact lenses of the corneal, scleral, bicurve and lenticular type as well as photographic and magnifying lenses.

The lens blanks are molded by an injection method from any suitable material such as cellulose acetate butyrate or polymethyl methacrylate or other thermosetting and thermoplastic materials in a mold having a cavity and ejection section. The molding method is closely regulated and parameters such as injection time, pressure, and temperatures and gate size are controlled to ensure the quality of the resulting lens.

The foregoing as well as other objects and advantages of the present invention will be more clearly understood by reference to the following detailed description when considered with the drawings which illustrate and show the lens and the method of making the lens of the present invention.

IN THE DRAWINGS

FIG. 1 is a perspective view of a pair of lens blanks as ejected from the mold;

FIG. 2 is a sectional view taken along lines 2—2 of FIG. 1;

FIG. 3 is a cross-sectional view of a completed lens with the lens blank being shown in dotted;

FIG. 4 is a plan view of the pair of lens blanks shown in FIG. 1;

FIG. 5 is a perspective view illustrating the mold core and cavity pin;

Figure 6:
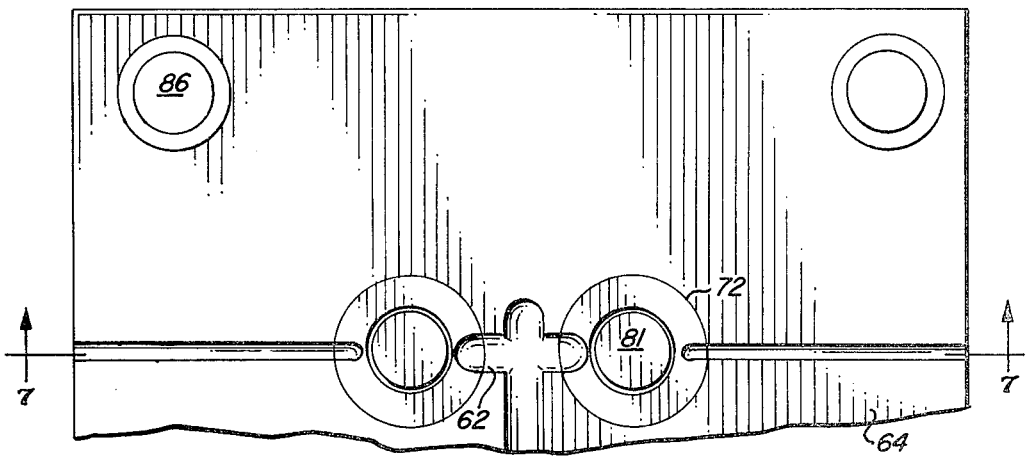
FIG. 6 is a view, partly broken away, of the ejection section of the mold as viewed along the part line.

Turning now to the drawings, FIGS. 1, 2 and 4 illustrate a pair of lens blanks as ejected from the mold. As pointed out above, the present invention is broadly applicable to optical lenses of all types, including contact lenses of the scleral, bifocal, lenticular, inter-occular and corneal types. The present invention relates to fabrication of lenses from the broad range of plastic materials both thermoplastic and thermosetting from the soft hydrophillic materials, such as, cross-linked ethylene glycol monomethacrylate or 2-hydroxylethylene methacrylate to the semi-rigid or hard materials, such as cellulose acetate butyrate and polymethylmethacrylate. In addition to use as optical lenses for correcting visual problems, lenses according to the present invention may also be used for such optical applications as precision photographic lenses and lenses for magnification purposes such as those used in display panels.

The blank assembly as shown in FIGS. 1, 2 and 4 is generally designated by the numeral 10 and is intended for use as a single vision contact lens of the "minus" type. As mentioned, other types of lenses may be fabricated according to the invention but for purposes of illustration, this type of lens is illustrated. The blank assembly includes lens blanks 12 oppositely disposed along on transverse runners 16 which extend generally perpendicular from runner 14. As is conventional in molding processes, the end section of the runner 14 forms a cold slug 18. Each of the individual blanks 12 are connected to the ends of the runners 16 by a fan or triangular gate section 20. Each of the individual lens blanks 12 are generally circular, having a generally flat bottom 24 and cylindrical side wall 26. A concave recess 28 is formed in the upper surface of the blank. The concave recess 28 forms a substantial part of the posterior curve of the completed lens. Thus, as will be explained more fully hereafter, the machining operation necessary to the completion of the lens is substantially minimized.

The individual blanks or buttons 12 are severed from the runners 16 at gate 20. The lens blanks or buttons 12 are supplied to the user or dispenser for completion. In the case of contact lenses, the operation includes machining the lenses to the proper optical qualities by removing material primarily from the base 24 to form the anterior surface of the lens. The lenses may be tinted or dyed with an appropriate inert pigment which is diffused uniformly through the plastic. Tinting or dying may be done by mixing a cloring agent with the resin or after the lens is completed. Specifications require that no mottling should be visible when the lens is viewed under 25X magnification with diffused background illumination.

Referring to FIG. 3, a completed "minus" lens is illustrated. The completed lens is designated by the numeral 30 and is concave-convex. A completed lens has an inner or posterior surface 32 which has a central base curve which may be spherical or aspherical, the radius of which increases gradually until a point is reached where the peripheral curve begins. The base curve is indicated by the diametrical area "C". The continuation of the spherical or aspherical base curve is shown in dotted at 34. The posterior peripheral curve which is employed to provide the necessary peripheral clearance is indicated by the letter "A" in FIG. 3. The most peripheral and flattest curve on the posterior surface of the lens is identified by the letter "B" and is designated the posterior peripheral curve or bevel. The edge 33 of lens 30 is where the curve "B" reverses and swings up and around to form a junction with the anterior curve 36 of the lens. The base curve, which is generally indicated in the section by the letter "C" is molded into the blank 12. Thus, the machining and finishing operations to complete the lens for optical use are minimized with material removal in the area defined by dotted lines being necessary. Machining or grinding to impart the posterior concavity is not required. The spherical or aspherical curve "C" is provided in the lens blank in the molding operation. The radius of the spherical curve may vary in accordance with the application. Accordingly, the lens blanks will be supplied to the user in a selection having various base curves. For example, typically the spherical base curves will range from 7.03 mm to 8.44 mm incrementally increasing 0.04 mm. Therefore, the ultimate manufacturer of the lens could stock a range of the lens blanks having the various base curves.

The lens blanks of the present invention are fabricated by an injection molding operation. The injection molding machine may be of various types adapted for injection molding small, close tolerance parts. Typical of this type of machine are the Boy 15/7 series. Detailed description of the injection molding machine is not deemed necessary, as these machines are well known in the plastic molding art. Generally, machines of the type include an automatic hopper or loader and desiccant hopper and dryer for receiving the appropriate resin. The material is delivered to the mold cavities through a barrel and reciprocating screw arrangement involving suitable heaters for the material in the hopper and both sections of the mold as well as the barrel. A nozzle hydraulically injects the viscous resin into the mold cavity.

Figure 7:
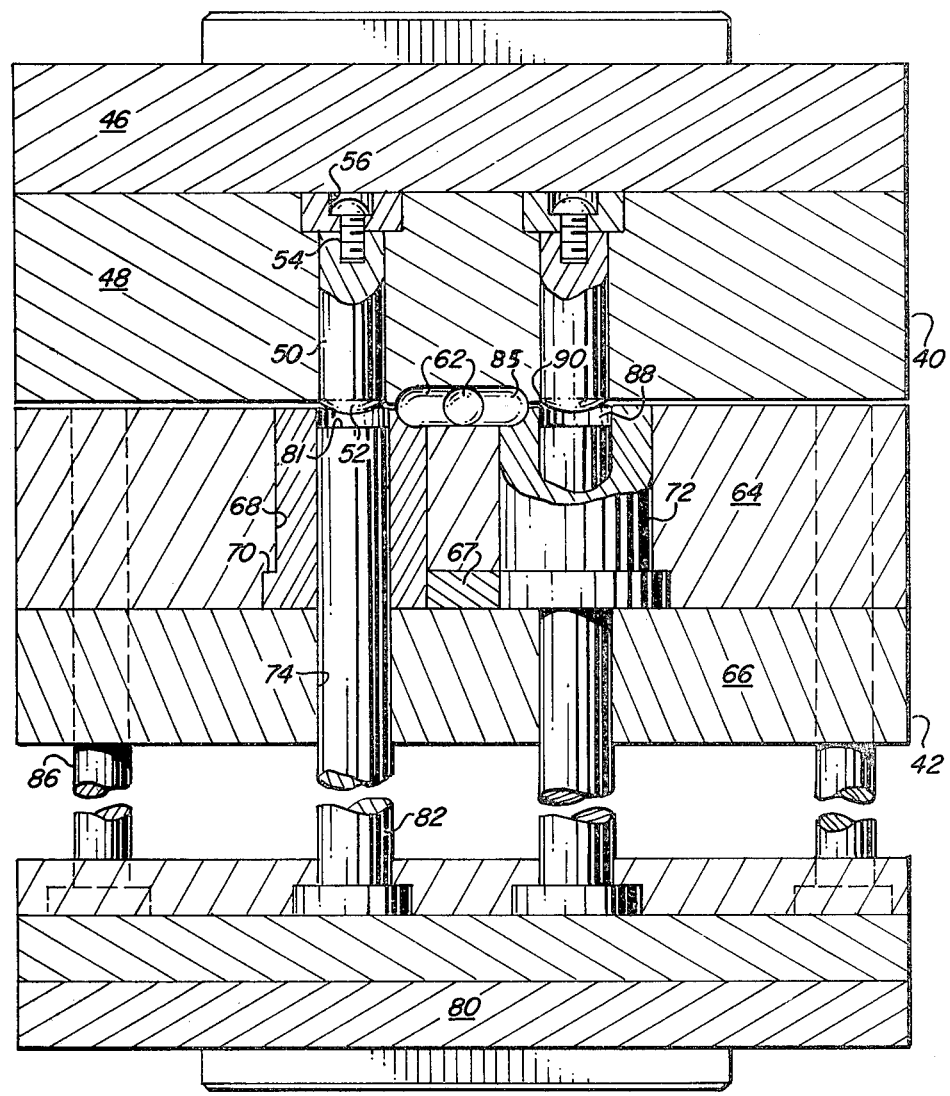
FIG. 7 is a sectional view taken along line 7—7 of FIG. 6.

The novel method of the present invention involves the use of unique mold design to achieve optical precision required. The mold is best seen in FIGS. 6 and 7. As shown in these figures, the mold includes a cavity section 40 which is sometimes referred to as the "A" section and the ejection section, which is sometimes referred to as the "B" section, indicated by the numeral 42. The cavity section 40 and the ejection section 42 in the closed position engage at part line 44. Cavity section 40 includes top platen 46 and adjacent cavity plate 48. Cavity plate 48 houses die or cavity pins 50 which are in the form of cylindrical pins having a lower end 52 defining the radius of curvature of the base curve of the completed lens blank. The cylindrical cavity pins 50 are secured in place in the cavity plate 48 by screws 54 which are a threaded engagement with the axial threaded section in the upper end of the pins. Recesses 56 provided in cavity plate 40 may be designed to include or receive any selected number of cavity pins. Preferably, the cavity pins are positoned on opposite sides of a mold runner 62 so that a pair of lens blanks are formed near the extremity of each runner. The mold is heated by appropriate means, not shown, such as electrical resistance heaters or circulating hot water.

The opposite portion of the mold generally designated by the numeral 42 is the ejection section. The ejection section 42 includes an insert plate 64 and back-up plate 66. The insert plate 64 defines two generally cylindrical recesses 68, having a large shoulder or step 70 near the lower end. The insert plate 64 receives inserts 72 having an exterior shape corresponding to the recess defined by cylindrical bore 68 and shoulder 70. The inserts 72 are held in place by back-up plate 66 and key 67. Back-up plate 66 similarly has bores 74 which align with a longitudinal center line of insert 72 and also with cavity pins 50. Lower plate assembly 80 secures ejection pins 82 and inserts 72. Alignment pins 86 are provided adjacent either edge of the lower plate 80. It will be seen that the upper end of insert 72 along with the curved lower end 52 of the cavity pins 50 and the generally flat upper end 81 of ejector pins 82 form the mold cavity 88. Cavity 88 connects with mold runner 62 at runner 86 and gate 90. It will be appreciated that the configuration of the end 81 of the ejector pins 82 and the end 52 of the cavity pins 50 can be varied to achieve the deserved configuration of the lens blank.

The mold insert is best seen in FIG. 5. As pointed out above, the mold insert has a generally cylindrical body 77 and a flange 92 which engages with shoulder 70 in the ejection plate 64. Flatened section 91 is engaged by key 67. Body 77 defines a generally cylindrical bore 83 which receives ejection pin 82. A small, generally triangular recess or fan 90 forms the gate section of the mold and controls the material flow into the cavity. Oppositely disposed from the gate is a radial slot 96 which aligns with vent 98 extending along the part line to relieve air from the mold.

In operation, an appropriate resin is placed in the hopper of the molding machine, as for example, polyethyl methacrylate. The resin is appropriately dried, heated and injected under pressure into the mold cavity 88 along the sprue, not shown, and into the runners 62 and 86 and across gate 90. After the material has been injected it is allowed to harden for the requisite time. At the completion of the cycle, the mold is opened and lower plate 80, by means of hydraulic or pneumatic actuators, is moved toward ejection plate 42 ejecting the completed part as shown in FIG. 1. The blanks 12 are separated from the runner portions and are ready to be supplied to the user.

The American National Standards Institute has set forth rigid requirements for first quality contact lenses. Optical requirements relate to the material, light transmission, refractive index, physical properties. For example, optical qualities require no bubbles, striae, or waves. Light transmission should not be less than 88 percent of visible light energy at a thickness of 0.10 mm. Further, there must be uniformity of index and refraction throughout the material and stability of the refractive index in air. Variation of the index and refraction must be no greater than 0.5 percent from the specified index. Further, the material must be machinable and easily polished. In the case of corneal lenses, the tolerances permissible in the base curve may be plus or minus 0.025 mm. Heretofore, these rigid criteria have not been maintained in prior art attempts to mold lenses of this quality. Therefore, complete machining, as described above was necessary. In carrying out the molding process of the present invention described above, process variables and parameters must be closely controlled. Failure to control the process parameters within specified ranges as practiced by present invention will result in lenses of inferior quality. For example, the following table sets forth process requirements for injection molding lenses. Table I indicates the process requirements using acrylic resins. Table II indicates process variables necessary to produce first quality optical lenses using cellulose acetate butyrate. These tables represent typical parameters which will vary somewhat when other materials are used.

Another typical procedure is to mount the blank or button on a spindle by use of blocking wax and attaching the spindle to an appropriate lathe. A diamond cutting tool is used to impart the proper curvature to the blank in accordance with the prescription.

From the foregoing, it will be obvious that the present invention provides a unique optical blank suitable for various applications and specially suited for use as a corneal, scleral, inter-occular, and lenticular contact lens. The lens according to the present invention may also be used as a high quality photographic or optical lens. Further, the present invention provides a unique molding method for constructing a blank which minimizes the finish work necessary by the user. The present invention also provides a unique method of fitting lenses including providing the partially finished lens blank which reduces time and is cost efficient.

Various modifications can be made without departing from the spirit of this invention or scope of the appended claims. The examples set forth in the disclosure are in no way to be considered as limiting. In view of the above, it will be obvious that various modifications and changes can be made to the invention as disclosed to the extent that these changes and modifications do not depart from the spirit and scope of appended claims and are intended to be encompassed therein.

I claim:

1. A method of making a first quality stress-free "hard" contact lens blank comprising:
   (a) injecting a viscous plastic material into a mold having:
      (i) a cavity plate and defining at least one cylindrical cavity bore for reception of a cavity pin;
      (ii) cavity pin means disposed in said cavity bore, said cavity pin having one end defining a prescribed configuration at a first surface of the lens;
      (iii) an injection section adapted to engage said cavity plate along a part-line, said ejection section defining a bore axially aligned with said cavity bore;

TABLES I AND II

| TABLE No | Time Inj.Hold | Inj.PSI | Temp. Nozzle °F. | Barrel Temp. Front °C. | Barrel Temp. Rear °C. | Mold Temp at Cavity °F. | Material Temp at Nozzle °F. |
|---|---|---|---|---|---|---|---|
| I | 2–10 sec. | 20–90 sec. | 5000–12000 | 450° F.–530° F. | 275° C.–220° C. | 265° C.–210° C. | 160° F.–210° F. | 400° F.–530° F. |
| II | 1–10 sec. | 10–60 sec. | 2500–15000 | 400° F.–480° F. | 230° C.–190° C. | 230° C.–180° C. | 140° F.–200° F. | 370° F.–450° F. |

The resulting lens blanks as molded in accordance with the foregoing techniques and parameters form a first quality lens meeting the requirements of the American National Standard Institute. Further, the resulting lens is provided with a convexity on one side which forms a substantial part of a curved surface of the resulting lens, minimizing or eliminating machining that ultimately has to be done to complete the lens to prescription requirements. The completion of the lens involves machining or finishing the lens in a more or less conventional manner to remove material at the base of the blank 12 to form the posterior curve of the lens and to round the edge of the lens and apply the spherical base curve in FIGS. 1 and 3. This may be done by mounting the lens blank on a blocking tool with conventional blocking wax. Machining, grinding and polishing can be completed in a conventional manner to complete the lens as shown in FIG. 3.

(iv) insert means in said cavity bore, said insert means defining a cylindrical opening adapted to receive at least the said end of said cavity pin means;
   (v) ejection pin means extending in said insert means and having an end defining a prescribed configuration at a second surface of the lens, said cavity pin means, ejection pin means and said insert defining a mold cavity which is of fixed configuration during molding;
(b) controlling injection time, holding time, pressure, nozzle and mold temperatures approximately within the following prescribed limits while maintaining a fixed relationship in said mold cavity:
Injection Time—1 to 10 seconds
Hold Time—10 to 90 seconds
Injection Pressure (PSI)—2,500 to 15,000
Nozzle Temperature—400° to 530° F.

Material Temperature at Nozzle—370° to 530°0 F.;
- (c) separating the cavity plate and injection section and ejecting the molded lens from the mold; and
- (d) finishing the lens blank to a lens by an appropriate finishing step to impart the required optical characteristics with little or no finishing operations being required at the said first surface.

2. The method of claim 1 wherein the material is cellulose acetate buterate (CAB).

3. The method of claim 1 wherein the material is polymethyl methacrylate (PMMA).

4. The method of claim 1 further including the steps of
- (a) injection molding a plurality of sets of lens blanks according to the steps of claim 1, each blank having a second unfinished side and a first semi-finished side provided with an optical curve of prescribed configuration, each set having differing preselected optical curves;
- (b) obtaining the patient's prescription for the optical characteristics of contact lens required by the patient;
- (c) selecting from among said sets of lens blanks the lens blanks having the proper semi-finished sides in accordance with the prescription of subparagraph (b); and
- (d) finishing of said selected lens blanks to conform to said prescription.

* * * * *